Nov. 21, 1950 R. ROUAT 2,530,442
ELECTRIC BATH
Filed Oct. 24, 1945 8 Sheets-Sheet 1
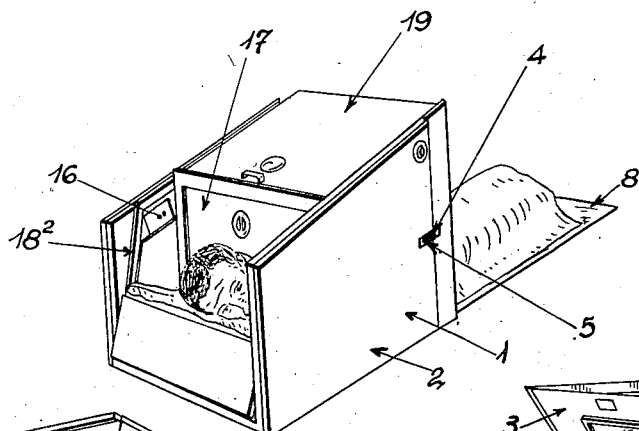
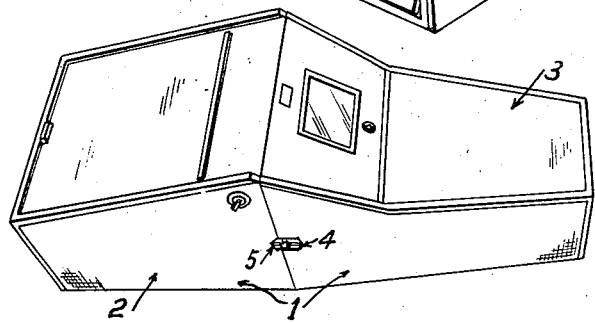
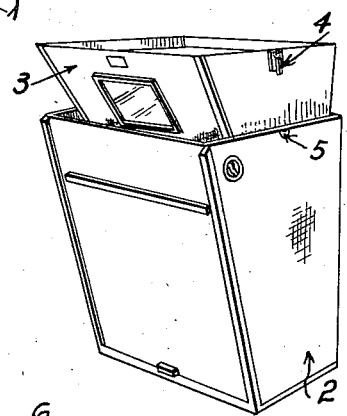
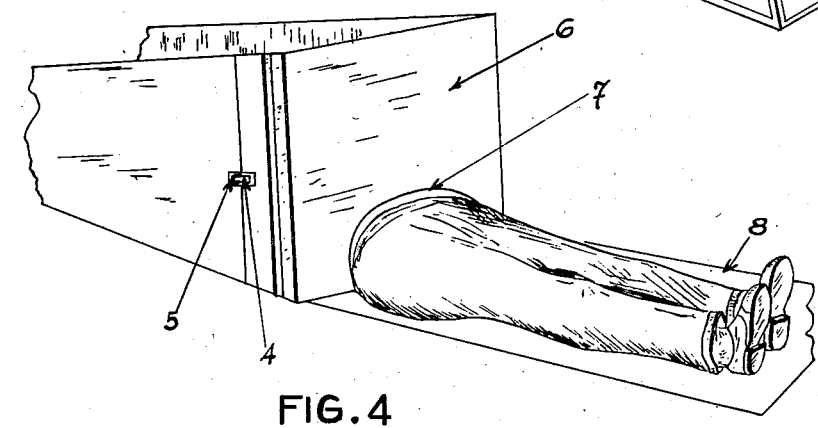
INVENTOR.
ROGER ROUAT.
BY Paul A. Talbot.
ATTORNEY.

INVENTOR.
ROGER ROUAT.
BY Paul A. Talbot
ATTORNEY.

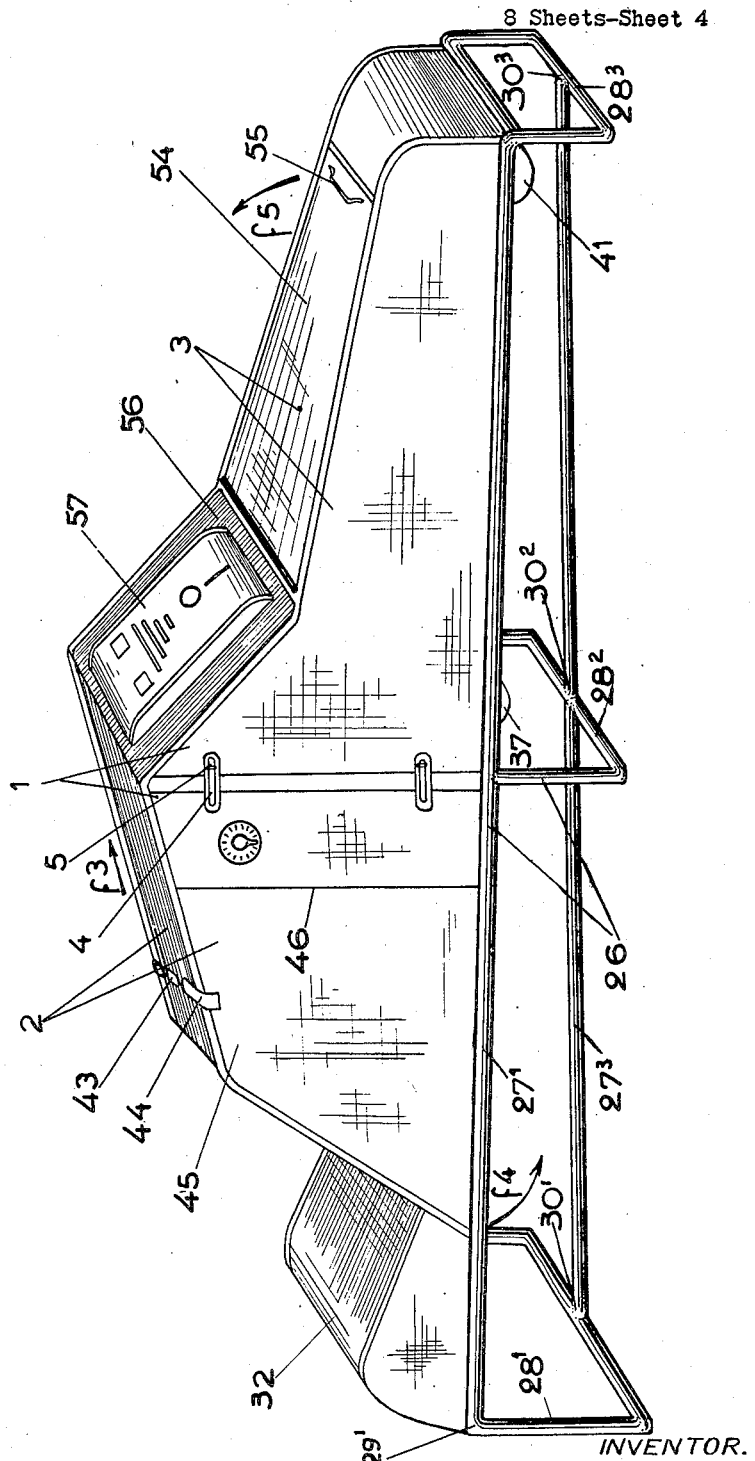

Nov. 21, 1950  R. ROUAT  2,530,442
ELECTRIC BATH
Filed Oct. 24, 1945  8 Sheets-Sheet 5

INVENTOR.
ROGER ROUAT.
BY Paul A. Talbot.
ATTORNEY.

Nov. 21, 1950     R. ROUAT     2,530,442
ELECTRIC BATH
Filed Oct. 24, 1945     8 Sheets-Sheet 6
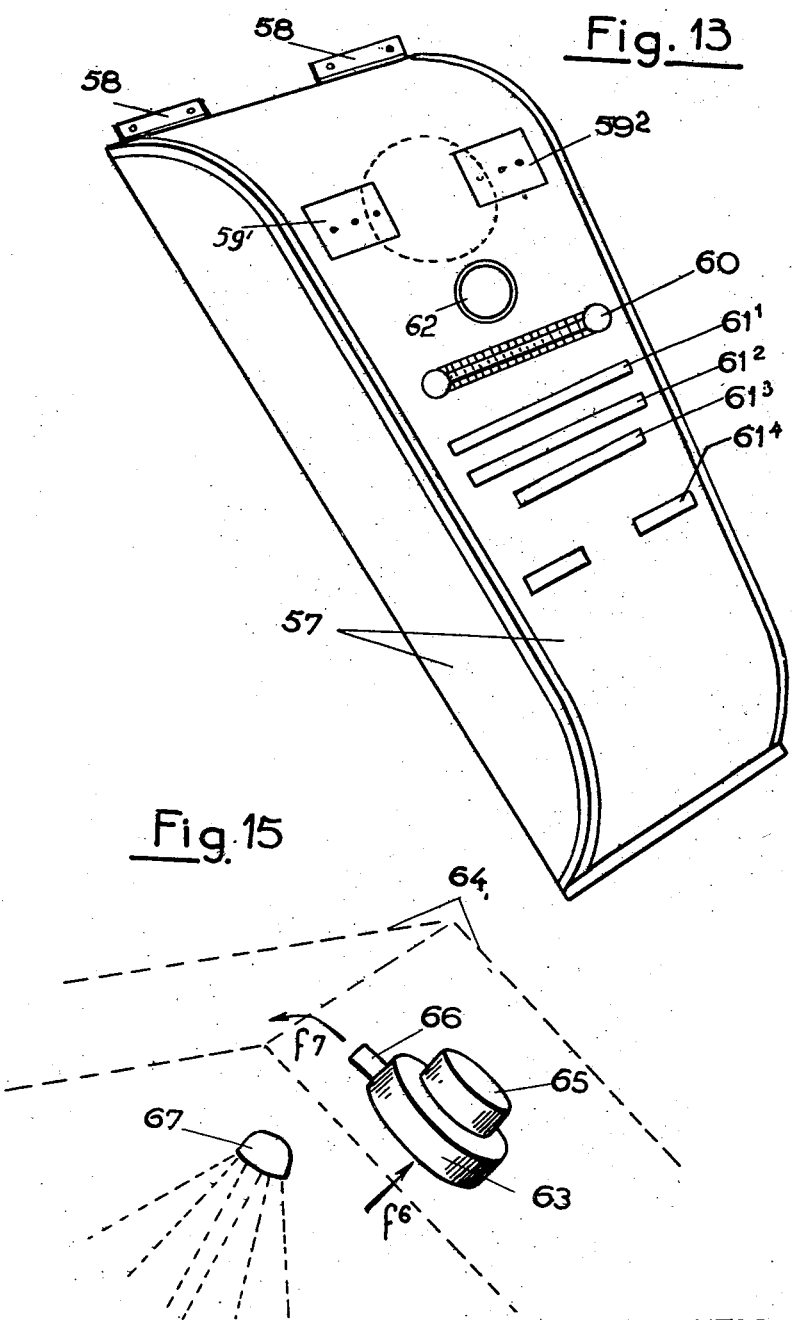
INVENTOR.
ROGER ROUAT.
BY Paul A. Talbot.
ATTORNEY.

Nov. 21, 1950     R. ROUAT     2,530,442
ELECTRIC BATH
Filed Oct. 24, 1945     8 Sheets-Sheet 7
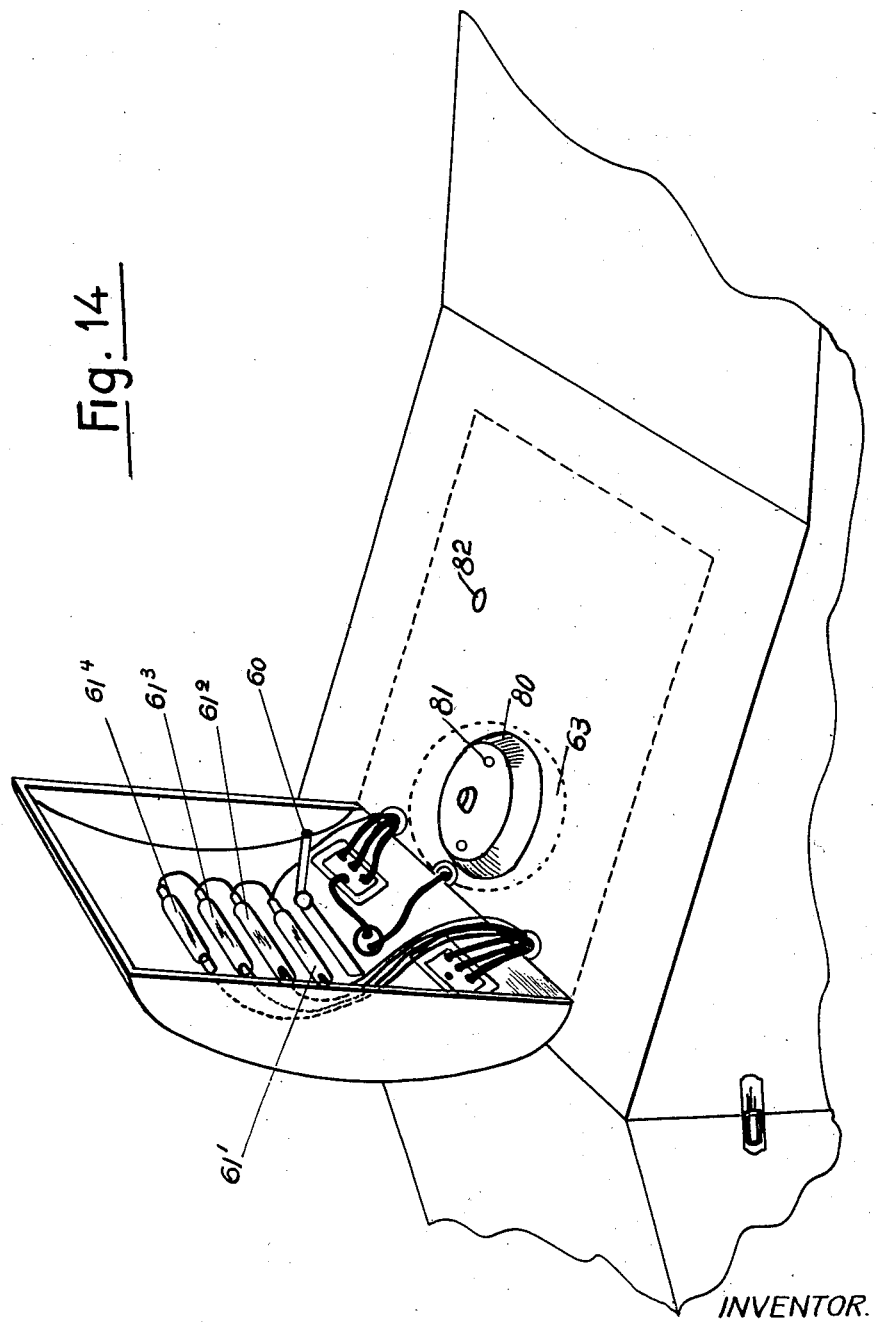
INVENTOR.
ROGER ROUAT.
BY Paul A. Talbot
ATTORNEY.

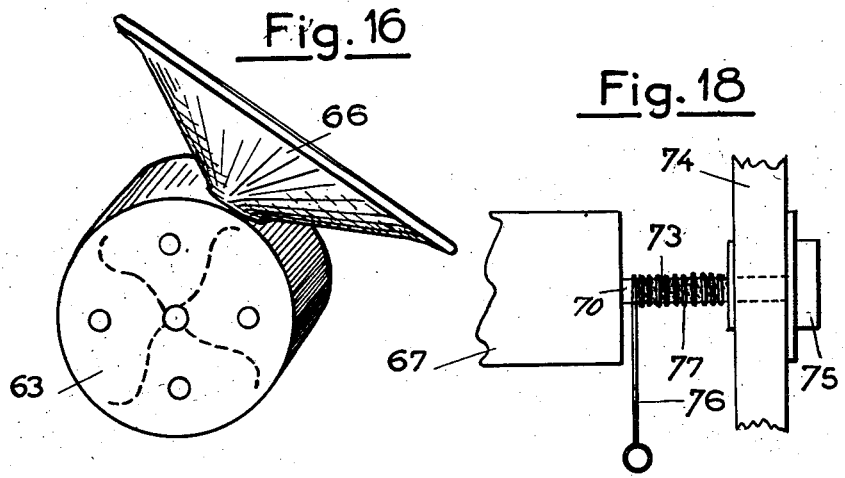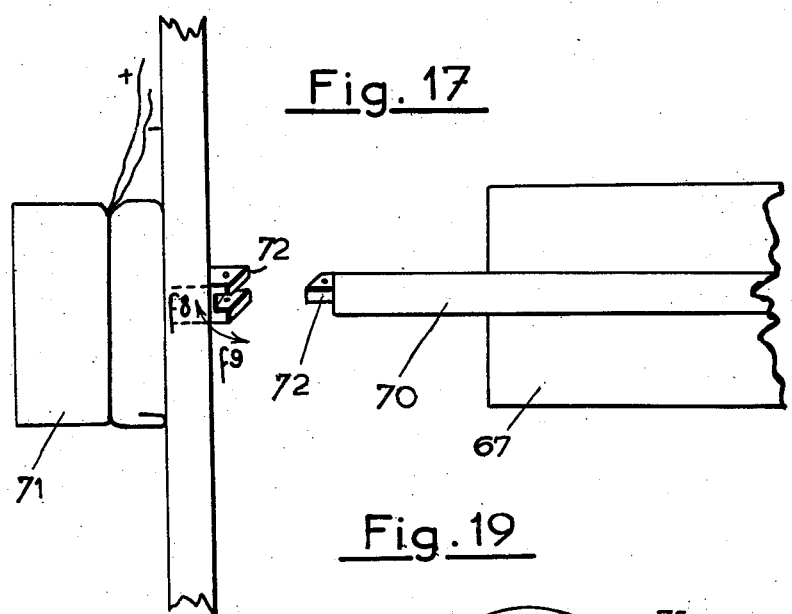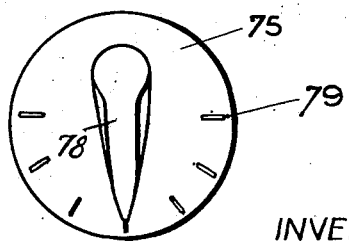

Patented Nov. 21, 1950

2,530,442

UNITED STATES PATENT OFFICE 2,530,442

ELECTRIC BATH

Roger Rouat, Paris, France

Application October 24, 1945, Serial No. 624,313
In France August 31, 1943

Section 1, Public Law 690, August 8, 1946
Patent expires August 31, 1963

5 Claims. (Cl. 128—373)

The present invention relates to improvements in and relating to electric baths.

Electric baths which comprise a closed cabinet of sufficient dimensions for allowing the patient to lie down therein are now known; this arrangement makes it possible to distribute an atmosphere having a uniform temperature upon the body of the patient and thus avoids excessive temperature on any one part of the body as related to another part. The patient may also rest during treatment and fatigue is thus avoided.

My invention relates to improvements to facilitate portability, easy handling, as well as storage when not in use.

I accomplish the above mentioned objects by the construction and features described in the following specifications which set forth my invention in the appended claims.

A preferred embodiment of my invention shown by way of example in the drawings which form a part of this disclosure, in which Figure 1 is a perspective view.

Figure 2 is a perspective view which shows the rear part encased in the front part.

Figures 3 and 4 are perspective views showing the electric bath reduced to its front part only and closed in the rear part by a board connected thru buckles turned over onto bolts, the legs of the patient passing thru said board.

Figure 9 is a perspective view showing my electric bath supported on a frame.

Figure 13 is the perspective view showing a control board mounted on the ceiling of the cabinet.

Figure 14 is a perspective view showing the upper part of the apparatus, the control board being removed.

Figure 15 is a perspective view of the blower showing the upper part of the ceiling in broken lines.

Figure 16 is a perspective view showing the fan and outlet.

Figure 17 shows one end of an electric radiator and a rocking electromotor for moving it reciprocally.

Figure 18 shows the other end of the axle and said radiator,

Figure 19 is a front view of the outer dial controlling the position of the electric radiator.

Figure 5:
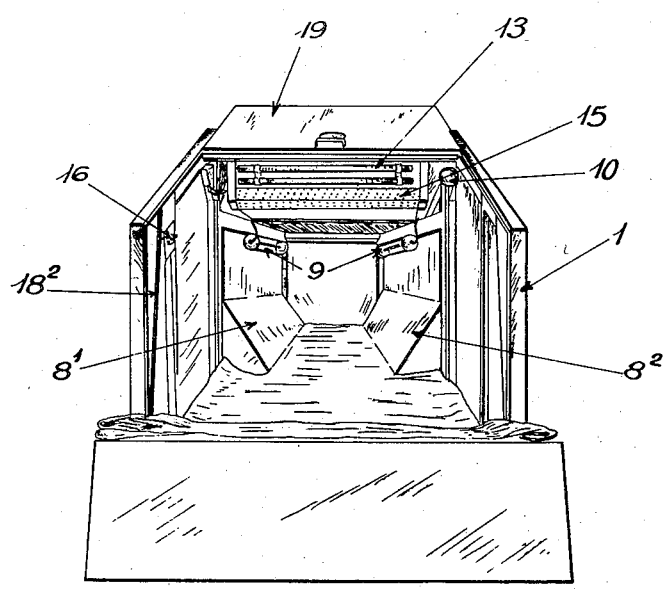
Figure 5 is a perspective view showing the inner chamber of the electric bath.

The electric bath shown in the appended drawings comprises a closed cabinet 1 of sufficient dimensions for making it possible for the patient to lie down therein. Said closed cabinet is formed of a front part 2 and a rear part 3, both said parts being removably connected with one another, for instance by means of threaded sockets 4 receiving the bolts 5.

This construction of the closed cabinet made of two parts which are separated from each other offers multiple advantages and more particularly the following ones:

(1) It is easy to encase the rear part 3 of the electric bath into the front part 2 (Figure 2), which considerably reduces the space required by the electric bath, more particularly in view of its storage in the position of rest and of its conveyance.

(2) Also this arrangement of two parts, a front part and a rear part, removably connected with each other greatly facilitates the repairs which are to be effected inside of the electric bath.

(3) This arrangement makes it also possible (Figures 3 and 4) to remove the rear part 3 of the electric bath entirely and to close the front part 2 by means of a rear closing board 6 removably applied onto the end of the front part (Figure 2) and connected with said front part for instance by means of sockets 4 and bolts 5. This rear closing board is provided with a notch 7 for the free passage of the legs of the patient.

An extension-piece 8 is removably secured at the rear of the front part 2 of the electric bath and serves as a support for the legs of the patient.

One thus obtains an electric bath which can be arranged so (Figure 3) as to submit the trunk of the body to the electric treatment and to allow the legs, on the contrary, to pass freely outside the closing board without undergoing any constraint or any useless treatment.

Figure 6:
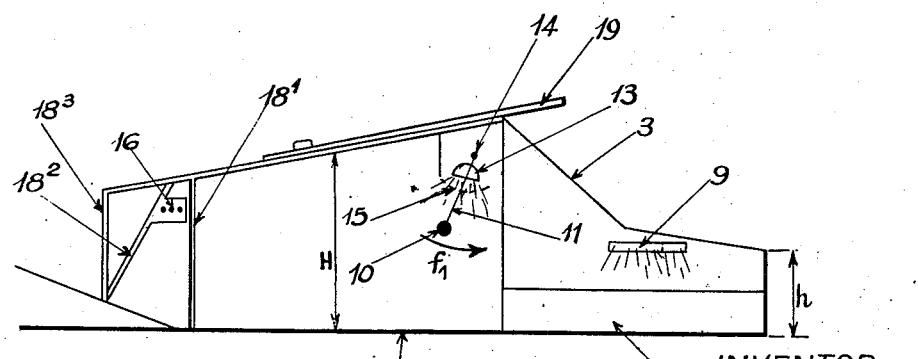
Figure 6 is a longitudinal sectional view of the same.

The closed cabinet shows the rear part 3, which is smaller in height and in width than the front; this narrowing in height is clearly visible in Figures 6 where the height H in the main chamber for the electric radiations is in the front part and the lesser height h in the rear part.

The narrowing in width is obtained by means of tapering the sides toward the end.

By this construction legs of the patient are maintained in a restricted space when the whole body is submitted to the electric treatment, which makes it difficult for legs to contact the electric radiators.

The legs of the patient are treated by the electric radiators 9 provided in the rear part 3 above the legs.

All the control members are arranged inside the closed cabinet, which makes it possible for the patient to actuate the control himself without help.

More particularly, a control handle 10 arranged near the hand of the patient thru the rod 11 regulates the angular disposition of the electric radiators 13 which is arranged in the front part of the electric bath above the trunk of the body and pivotally mounted to swing on the axis 14.

By moving the handle in the direction of the arrow f.1 or in the reverse direction the operator rotates said electric radiators together about the center 14 and thus regulates at will the angle of the beam of radiations. Thus, the patient can direct said radiations onto any particular part of the body, at will.

A guard or grid 15 is arranged below the radiators in order to avoid harm by contact.

Electric switches 16 are arranged on the side wall at the front part of the cabinet; other controls make it possible for the patient to regulate, at will, the working of the radiators 9 and 13 according to the intensity of the radiation effect which he desires to obtain and which he can bear.

Figure 7:
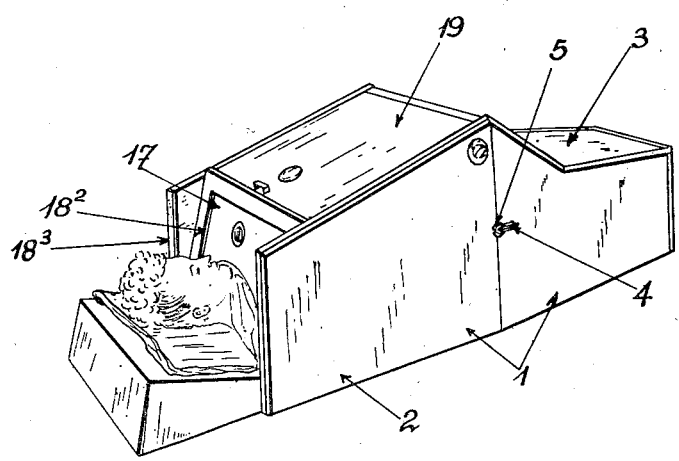
Figure 10:
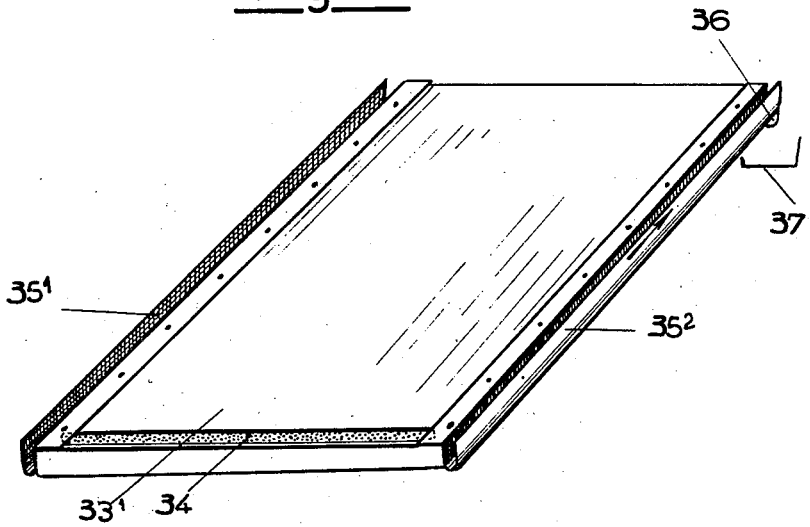
Figure 10 is a perspective view showing the front end of the floor.
Figure 11:
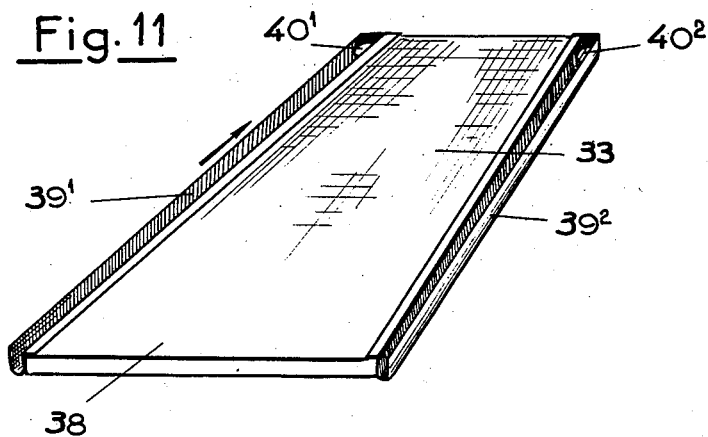
Figure 11 is a perspective view showing the rear end of the floor.
Figure 12:
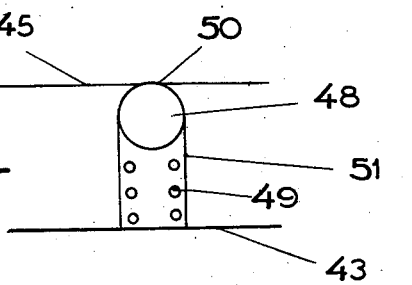
Figure 12 shows a detail of the door fastening.

An end closing board 17 is removably mounted on the front part of the front part of the cabinet. Said closing board engages the slide-ways 18 or 18′, 18″, 18‴ provided in the walls of the cabinet; the way 18′ being disposed on incline, which makes it possible to mount the closing board in different positions and to give it a different slope. More particularly, Figure 7 shows the sloping position of the closing board engaging its sloping slide way wall 18 so as to come to apply itself in the height of the neck of the patient and thus to permit the electric action upon the whole body.

Figure 8:
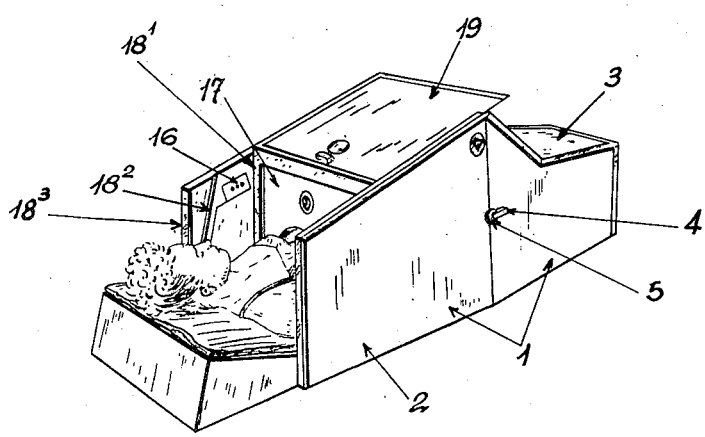
Figures 7 and 8 are two perspective views showing the inner closing board removably mounted on the front part of the closed cabinet and occupying two successive positions, one for the treatment of the whole body and the other for the partial treatment of the body, the thoracic chest remaining outside the electric bath.

Figure 8 shows a second position of the closing board 17 in which said board engages the vertical slide-way 18′ which makes it possible for the closing board to apply itself on the body while leaving the thoracic cage of the user outside the closed cabinet.

The closing board 17 is combined with an entrance door 42 provided with slide-ways 19 near the top edge of the front part of the cabinet and taking different positions according to the different positions occupied by the closing board; the whole unit formed of said entrance door with the slideway 5 and the closing board 17 insure the complete and tight closing of the cabinet for the electric radiations. Thus my cabinet may be adjusted to the part of the body which it is desired to treat; Figure 7 shows the arrangement of the electric bath for the treatment of the whole body of the patient while Figure 8 shows the arrangement of the electric bath for the treatment of the pelvis and of the legs of the patient, the thoracic cage remaining outside the apparatus.

The inner side walls of the front part 2 are smooth, which permits the free movement of the shoulders of the patient during the whole time of the application of the electric radiations.

In Fig. 9 I have shown a cradle 26 which is constituted with the upper beams 27′, 27″ and by a lower beam 27‴ which connects the feet 28′, 28″, 28‴. These elements are preferably constructed of tubes suitably welded together; the upper beams 27′, 27″ are bent at 29′, 29″ so as to be connected with the foot at the ends to constitute frames. The beam 27‴ is welded onto the frames or feet at 30′, 30″, 30‴; a center frame or foot thus also being provided.

The board or floor after 31 of the cabinet may be sloped with respect to horizontal line; accordingly, the body of the patient when prone lies on the floor of the cabinet with the head on the sloping support 32 affording a more comfortable position, to avoid congestion.

The inclined floor is constructed of two parts: the front floor 33′ and the rear floor 33″; the front floor is covered with a rubber sheet 24 of soft rubber and is provided on both its longitudinal sides with gutters 35′, 35″ which receive the sweat flowing from the body of the patient during the treatment. After having followed said sloping gutters said sweat flows out thru openings 36 into gutters 37 arranged below the floor. Thus, said sweat can be collected and removed in the direction f.1, to avoid disagreeable odor.

Likewise, the rear part 38 of the floor is provided with gutters 39′, 39″ which are also inclined owing to the slope of the cradle 26 and show a gradient sufficient for insuring the outflow of the sweat in the direction f.2 to the outlet holes 40, said sweat being then collected outside the bath in cups 41.

In a word, the cradle 26 renders the position of the patient more comfortable and facilitates the removal of the sweat.

The electric bath also comprises a device facilitating the entrance of the patient into the closed cabinet.

The door 42 is slidably mounted so as to slide in the direction f.3 to open and in the reverse direction to close the cabinet, this sliding movement being easily effected by means of a handle 43.

The door 42 is provided with keeper hooks 44 over the side walls of the front part 2 of the cabinet, one of which is provided with a door 45 connected and swung by means of a hinge 46. Said door is also provided with a handle 47; and the floor by means of a ball detent 48 urged by a spring 49 to engaging a hollow 50 provided in the lower edge of the door 45.

The patient entering the cabinet first slides the cover 42 in the direction of the arrow f.3 so that the hooks 44 of said door release the door 45 entirely. Said door 45 is then swung in the direction f.4 on its hinge 46. The closed cabinet is then open and the patient can sit freely on the floor 33 in the same manner as the user of a motorcar sits on the seat of his car, with his legs on the floor and then placing, his head to rest upon the sloping support 32.

For closing the cabinet the above mentioned operations are reversed and the cabinet is then entirely closed and the electric bath can be put into action.

Thus, this arrangement permits an easy entrance of the patient into the cabinet, on the one hand, and the tight closing of said cabinet, on the other hand.

A cap 54 with an operating handle 55 and a hinge 56 is arranged in the rear part of the bath. Said cap can easily be raised in the direction of the arrow f.5, thus allowing an easy access to the various controls and particularly for access to the electric radiator mounted in said rear part for the treatment of the legs of the patient.

A control board 57 is removably mounted on the roof of the cabinet which carries the controls which are thus grouped near at hand for the operator and convenient for supervision and control of the electric radiators.

The control board may have a dome forming a small compartment removably connected with the roof of the cabinet by means of a hinge 58. This board carries on its outer face the various supervision and control devices and more particularly the switches 59', 59'' thru which the electric circuits of the radiators in the bath can be controlled, the thermometer 60 thru which the temperature inside the bath is constantly controlled, and the pilot lamps 61', 61'', 61''', 61'''', etc. which are mounted in series with each heating radiator and thus make it possible for the operator to control the regular working of the whole apparatus as desired.

Referring particularly to Figure 14 we see the motor 80 which actuates the fan 63, the holes 83 for the passage of the electric connections, the lubricating holes 81 and the thermometer well 82 into which the sensitive extremity of the thermometer is inserted.

The electric bath is also combined with a time-device 62 which automatically interrupts the electric circuit after a predetermined time.

Accordingly, the operator, after having adjusted said time-device and the working of the whole apparatus, is sure that the action of the radiations on the patient will last only the time which has been determined in advance and to then be interrupted automatically. The operator is thus sure that too prolonged and dangerous action is avoided. Thus, the operator can freely attend to other occupations and tend other electric baths. Owing to this fact, the operator enjoys a greater liberty of managing, the security of the patient remaining nevertheless warranted.

The electric bath according to the invention also comprises a circulating fan 63 arranged in the upper part of the roof 64 of the cabinet over the main radiator 67 and inside the chamber of the cabinet. Said fan is actuated by an electromotor 65 located outside the closed cabinet and discharges the hot air thru a nozzle 66 of a very long form (Figure 15).

This electric bath works as follows:

The fan 63 actuated by the electric motor 65 sucks in the hot air in the direction of the arrow f.6 and discharges it in the direction f.7 thru a nozzle 66. Owing to this fact, this hot air collected under the roof of the cabinet is thrown onto the body of the patient and acts efficaciously upon said body in combination with the heat radiated directly by the lower radiator 67.

This arrangement offers the great advantage of avoiding the accumulation of the hot air in the upper part of the roof and of returning said air upon the body of the patient so that the heat accumulated in said air is directed efficaciously onto said body; owing to this fact, the efficiency of the electric bath is considerably increased.

Referring to Figures 17, 18 and 19, which show a radiator controlling device insuring an easier and more efficacious action of the radiator. The axis 70 of the radiator 67 is provided at one end with a clutch for connecting it with a rocking electromotor 71 which is, for instance, similar to the rocking electromotor actuating the wind-screen wiper of motorcars.

For this purpose, the axis 70 is coupled with the axis of the rocking motor by any known means, for instance thru a tenon and mortise device 72.

When said coupling is effected and the current established in the rocking motor the latter causes the axis 70 with the radiator 67 mounted thereon to rock in the direction f.8, f.9 so that the beam issued by said radiator sweeps a whole region of the body of the patient and insures a perfectly regular treatment of this region. This is particularly advantageous for certain therapeutic treatments such as the treatment of sciatica. The other end 73 of the axis of the radiator 67 passes thru the wall 74 of the closed cabinet and is fastened on the side of the cabinet to the indicator 75.

An inner hand control device such as a cord 76 is secured to and wound on the axis 70 of the radiator while a spring 77 tends to return the radiator while reciprocating or to a suitably chosen initial position as desired.

The outer indicator 75 has an index hand 78 moving in front of an outer dial 79. Said dial carries indications such as: foot, leg, knee etc. making it possible for the operator to ascertain the direction of the radiating beam acting upon the body of the patient.

The whole arrangements which are used for the control of the regulating devices as shown in Figures 17, 18 and 19 insure numerous advantages for which my device is suited.

I claim:

1. In an electric bath having electric radiating means, a front half-cabinet for treating the upper part of the body, a rear half cabinet having electric radiating means and means for connecting both half cabinets end to end, electric radiators being suitable for treating the entire body and radiators mounted in the rear half-cabinet above the legs for treating the legs, said rear half-cabinet being of a size and shape in relation to said front half-cabinet to be stored within said front half to save space in shipping and storage.

2. In an electric bath having electric radiating means, a front half-cabinet for treating the upper part of the body, a rear half cabinet having electric radiating means and means for connecting both half-cabinets end to end, electric radiators being suitable for treating the entire body and radiators mounted in the rear half-cabinet above the legs for treating the legs, a front end closure, side walls of said front half-cabinet having a plurality of slide ways for receiving said front end closure at different positions to lengthen or shorten said cabinet.

3. In an electric bath having electric radiating means, a front half-cabinet for treating the upper part of the body, a rear half-cabinet having electric radiating means and means for connecting both half-cabinets end to end, electric radiators being suitable for treating the entire body and radiators mounted in the rear half-cabinets above the legs for treating the legs, a front end closure, side walls of said front half-cabinet having a plurality of slide ways for receiving said front end closure at different positions to lengthen or shorten said cabinet, and a top door slidable in said front half cooperating with said front end closure to close said cabinet, and a side door swingably mounted to the front side walls of said cabinet to cooperate with said top door for entrance to said cabinet.

4. In an electric bath having electric radiating means, a front half-cabinet for treating the upper part of the body, a rear half-cabinet having electric radiating means and means for connecting both half-cabinets end to end, electric radiators being suitable for treating the entire body and radiators mounted in the rear half-cabinets above the legs for treating the legs, a front end closure, side walls of said front half-cabinet having a plurality of slide ways for receiving said front end closure at different positions to lengthen or shorten said cabinet, and a top door slidable in said front half cooperating with said front end closure to close said cabinet, and a side door swingably mounted to the front side walls of said cabinet to cooperate with said top door for entrance to said cabinet, hooks secured to said top door for locking said side door when both doors are closed.

5. In an electric bath having electric radiating means, a front half-cabinet for treating the upper part of the body, a rear half-cabinet having electric radiating means and means for connecting both half-cabinets end to end, electric radiators being suitable for treating the entire body and radiators mounted in the rear half-cabinets above the legs for treating the legs, a front end closure, side walls of said front half-cabinet having a plurality of slide ways for receiving said front end closure at different positions to lengthen or shorten said cabinet, and a top door slidable in said front half cooperating with said front end closure to close said cabinet, and a side door swingably mounted to the front side walls of said cabinet to cooperate with said top door for entrance to said cabinet, hooks secured to said top door for locking said side door when both doors are closed, and spring detent means for holding said side door in position.

ROGER ROUAT.

REFERENCES CITED

The following references are of record in the file of this patent:

UNITED STATES PATENTS

| Number | Name | Date |
|---|---|---|
| 619,953 | George | Feb. 21, 1899 |
| 791,233 | Wolpers | May 30, 1905 |
| 1,051,349 | Neitro | Jan. 21, 1913 |
| 2,012,221 | Clark et al. | Aug. 20, 1935 |
| 2,184,418 | Faigle | Dec. 26, 1938 |
| 2,311,415 | Rouat | Feb. 16, 1943 |